United States Patent
Keller

(10) Patent No.: US 10,507,930 B2
(45) Date of Patent: Dec. 17, 2019

(54) AIRPLANE WITH ANGLED-MOUNTED TURBOPROP ENGINE

(71) Applicant: Rolls-Royce North American Technologies, Inc., Indianapolis, IN (US)

(72) Inventor: Richard K. Keller, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 488 days.

(21) Appl. No.: 15/359,188

(22) Filed: Nov. 22, 2016

(65) Prior Publication Data

US 2018/0141670 A1    May 24, 2018

(51) Int. Cl.
| | |
|---|---|
| *B64D 27/12* | (2006.01) |
| *B64D 29/02* | (2006.01) |
| *B64D 33/04* | (2006.01) |
| *B64D 33/08* | (2006.01) |
| *B64D 35/02* | (2006.01) |
| *F01D 15/12* | (2006.01) |
| *F01D 25/24* | (2006.01) |
| *F01D 25/30* | (2006.01) |
| *F02C 7/04* | (2006.01) |

(52) U.S. Cl.
CPC ............ *B64D 27/12* (2013.01); *B64D 29/02* (2013.01); *B64D 33/04* (2013.01); *B64D 33/08* (2013.01); *B64D 35/02* (2013.01); *F01D 15/12* (2013.01); *F01D 25/24* (2013.01); *F01D 25/30* (2013.01); *F02C 7/04* (2013.01); *B64D 2033/045* (2013.01); *F05D 2220/323* (2013.01)

(58) Field of Classification Search
CPC ........ B64D 27/12; B64D 29/02; B64D 35/02; B64D 2033/045
See application file for complete search history.

(56) References Cited

U.S. PATENT DOCUMENTS

| | | | | |
|---|---|---|---|---|
| 4,930,725 A | * | 6/1990 | Thompson | B64C 11/14 244/53 R |
| 6,367,736 B1 | * | 4/2002 | Pancotti | B64C 29/0033 244/48 |
| 9,249,731 B2 | | 2/2016 | Sidelkovskiy et al. | |

(Continued)

FOREIGN PATENT DOCUMENTS

| | | |
|---|---|---|
| EP | 1690790 A1 | 8/2006 |
| EP | 2774852 A2 | 9/2014 |

(Continued)

OTHER PUBLICATIONS

European Office Action for European Patent Application No. 17199663.0 dated Feb. 21, 2019, 5 pgs.

(Continued)

*Primary Examiner* — Philip J Bonzell
*Assistant Examiner* — Tye William Abell
(74) *Attorney, Agent, or Firm* — Barnes & Thornburg LLP

(57) ABSTRACT

An airplane including an airframe and a turboprop propulsion system is disclosed in this paper. The turboprop propulsion system includes a propeller mounted for rotation about a propeller axis and a gas turbine coupled to the propeller to drive rotation of the propeller.

19 Claims, 3 Drawing Sheets

(56) References Cited

U.S. PATENT DOCUMENTS

| | | | |
|---|---|---|---|
| 2012/0199699 A1* | 8/2012 | Isaac | B64C 29/0033 |
| | | | 244/7 R |
| 2014/0252159 A1* | 9/2014 | Stretton | B64D 27/14 |
| | | | 244/54 |
| 2014/0252160 A1 | 9/2014 | Suciu et al. | |
| 2014/0263854 A1* | 9/2014 | Ross | B64C 29/0033 |
| | | | 244/7 A |
| 2016/0146104 A1 | 5/2016 | Penda et al. | |
| 2016/0333797 A1* | 11/2016 | Laramee | B64D 33/04 |
| 2017/0137135 A1* | 5/2017 | Chanez | B64D 27/18 |
| 2017/0158323 A1* | 6/2017 | Ross | B64C 29/0033 |
| 2017/0197712 A1* | 7/2017 | Alber | B64C 29/0033 |
| 2017/0217595 A1* | 8/2017 | Baldwin | B64C 29/0033 |

FOREIGN PATENT DOCUMENTS

| | | | |
|---|---|---|---|
| EP | 2778063 A1 | 9/2014 | |
| EP | 2837559 A1 | 2/2015 | |
| WO | 2005100765 A1 | 10/2005 | |

OTHER PUBLICATIONS

Extended EP Search Report completed on Apr. 6, 2018 and issued in connection with EP Appln. No. 17199663.0.

\* cited by examiner

AIRPLANE WITH ANGLED-MOUNTED TURBOPROP ENGINE

FIELD OF THE DISCLOSURE

The present disclosure relates generally to airplanes powered by gas turbine engines, and more specifically to airplanes powered by turboprop engines. Additionally disclosed is an improved infrared suppression system for reducing the heat signature of gas turbine engines used in airplanes.

BACKGROUND

Airplanes are sometimes powered by gas turbine engines. In some applications, gas turbine engines incorporated into airplanes can be used to independently provide thrust from pressurized exhaust gasses discharged from the engines themselves. In other applications, gas turbine engines incorporated into airplanes can be used to drive shrouded fans used to provide thrust from discharged air moved through ducts. In still other applications, gas turbine engines incorporated into airplanes can be used to drive unshrouded propellers used to provide thrust from air accelerated by the propellers.

The combination of a gas turbine engine and a propeller used in an airplane is sometimes called a turboprop or a turboprop engine. Turboprops sometimes include a gearbox coupled between the gas turbine engine and the propeller to adjust the speed of the propeller relative to the speed of the gas turbine engine. The packaging of such gas turbine engines, propellers, and optional gearboxes can present packaging and aerodynamic design challenges. Accordingly, there are opportunities to improve these designs over the prior art.

SUMMARY

The present disclosure may comprise one or more of the following features and combinations thereof.

According to one aspect of the present disclosure, a propulsion system may include a propeller, a gas turbine engine, and a gearbox. The propeller may be mounted for rotation about a propeller axis. The gas turbine engine may be mounted to establish an engine axis of rotation different from the propeller axis to form an offset angle therebetween. The gearbox may be coupled between the propeller and the gas turbine engine and configured to accommodate the offset angle between the propeller axis and the engine axis of rotation. In some embodiments, the offset angle may be between 10 degrees and 15 degrees.

In some embodiments, the propulsion system may include a nacelle that houses the gas turbine engine. The nacelle may include an inlet duct. The inlet duct may be shaped to provide a direct line of sight from an inlet of the gas turbine engine to an engine-air-entry aperture of the nacelle. In some embodiments, the nacelle may include an exhaust duct. The exhaust duct may be shaped to provide a direct line of sight from an exhaust discharge outlet of the gas turbine engine to an exhaust-outlet aperture of the nacelle.

In some embodiments, the nacelle may include an infrared suppressor. The infrared suppressor may be coupled to the gas turbine engine and configured to conduct exhaust gasses at least part way from the exhaust discharge outlet of the gas turbine engine to the exhaust-outlet aperture of the nacelle. The infrared suppressor may have a direct line of sight from the exhaust discharge outlet of the gas turbine engine to the exhaust-outlet aperture of the nacelle.

In some embodiments, the inlet duct has a Y-shape that extends to two engine-air-entry apertures. Direct lines of sight are provided from the inlet of the gas turbine engine to both of the engine-air-entry apertures.

According to another aspect of the present disclosure, an airplane may include an airframe and a propulsion system. The airframe may include a fuselage and a wing coupled to the fuselage. The propulsion system may be coupled to the airframe to provide thrust for the airplane and include a propeller and a gas turbine engine. The propeller may be mounted for rotation about a propeller axis. The gas turbine engine may be coupled to the propeller to drive the propeller about the propeller axis.

In some embodiments, the gas turbine engine may be mounted to establish an engine axis of rotation different from the propeller axis and form an offset angle between the propeller axis and the engine axis of rotation. In some embodiments, the gas turbine engine may be mounted such that a vector of exhaust gasses discharged from the gas turbine engine during use has a downward component that provides lift to the airplane relative to the ground when the plane is landed on the ground when the turboprop propulsion system is in use. In some embodiments, the offset angle between the propeller axis and the engine axis of rotation may be between 10 degrees and 15 degrees.

In some embodiments, the turboprop propulsion system may include a gearbox. The gearbox may be coupled between the propeller and the gas turbine engine and configured to accommodate the offset angle between the propeller axis and the engine axis of rotation. The gearbox may be coupled to the propeller mounted for rotation about the propeller axis and to an output shaft of the gas turbine engine adapted to rotate about the engine axis of rotation.

In some embodiments, the airplane may include a nacelle. The nacelle may house the gas turbine engine and at least part of the gearbox. In some embodiments, the nacelle may include an inlet duct. The inlet duct may be shaped to provide a direct line of sight from an inlet of the gas turbine engine to an engine-air-entry aperture of the nacelle. In some embodiments, the nacelle may include an exhaust duct. The exhaust duct may be shaped to provide a direct line of sight from an exhaust discharge outlet of the gas turbine engine to an exhaust-outlet aperture of the nacelle.

In some embodiments, the nacelle may include an infrared suppressor. The infrared suppressor may be coupled to the gas turbine engine and configured to conduct exhaust gasses at least part way from the exhaust discharge outlet of the gas turbine engine to the exhaust-outlet aperture of the nacelle. The infrared suppressor may have a direct line of sight from the exhaust discharge outlet of the gas turbine engine to the exhaust-outlet aperture of the nacelle. In some embodiments, the nacelle may include a suppressor-air aperture configured to conduct air to the infrared suppressor during use of the turboprop propulsion system. The suppressor-air aperture may be spaced apart from the engine-air-entry aperture.

In some embodiments, the nacelle may include a heat exchanger and a cooling-air aperture. The heat exchanger may receive air flow from the cooling-air aperture during use of the turboprop propulsion system. The cooling-air aperture may be spaced apart from the engine-air-entry aperture of the nacelle. The heat exchanger may be arranged below the gas turbine engine when the plane is landed on the ground.

These and other features of the present disclosure will become more apparent from the following description of the illustrative embodiments.

DETAILED DESCRIPTION OF THE DRAWINGS

Figure 1:
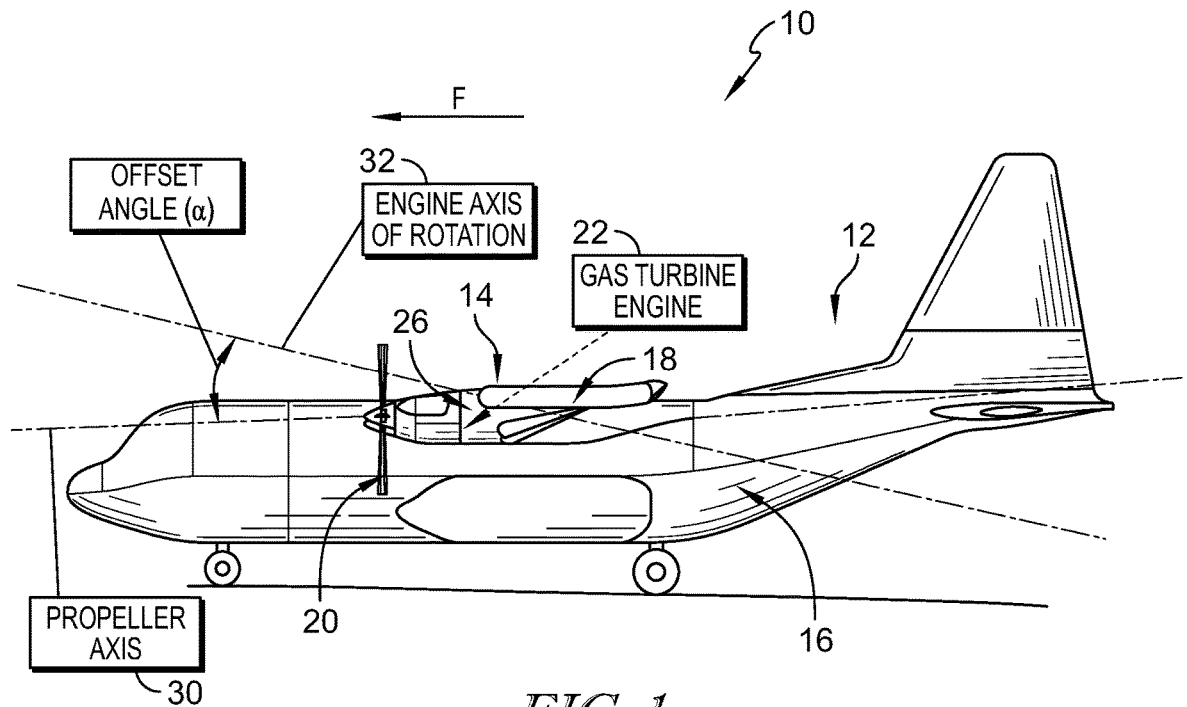
FIG. 1 is a side elevation view of an airplane including an airframe and a turboprop propulsion system showing that the turboprop propulsion system includes a propeller mounted for rotation about a propeller axis, a gas turbine engine mounted to establish an engine axis of rotation, and a nacelle in which the gas turbine engine is housed and showing that the engine axis of rotation is different from the propeller axis forming an offset angle α such that exhaust discharged from the gas turbine engine provides some lift to the airplane when the gas turbine engine is in use.

For the purposes of promoting an understanding of the principles of the disclosure, reference will now be made to a number of illustrative embodiments illustrated in the drawings and specific language will be used to describe the same.

An airplane 10 includes an airframe 12 and a turboprop propulsion system 14 as shown in FIG. 1. The airframe 12 includes a fuselage 16 and wings 18 coupled to the fuselage 16 to generate lift for the airplane 10 when the airplane 10 moves in a forward direction F. The turboprop propulsion system 14 includes a propeller 20 that provides thrust to move the airplane 10 in the forward direction F when rotated, a gas turbine engine 22 that powers rotation of the propeller 20, and a gearbox 24 that interconnects the propeller 20 and the gas turbine engine 22 as shown in FIG. 2.

Figure 2:
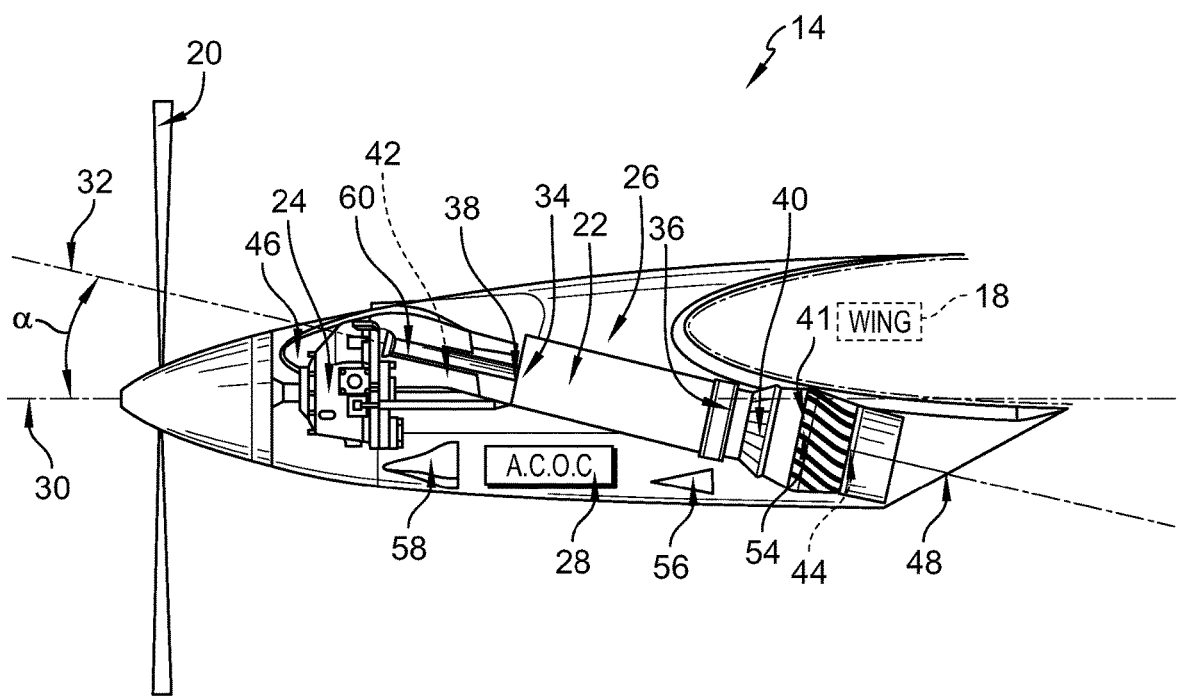
FIG. 2 is a detail view of the turboprop propulsion system of FIG. 1 with a portion of the nacelle broken away to show a gearbox coupled between the propeller and the gas turbine engine to accommodate the offset angle α and showing that an air-cooled oil cooler (A.C.O.C.) included in the turboprop propulsion system is also housed in the nacelle.

In the illustrative embodiment, the propeller 20 is mounted for rotation about a propeller axis 30 as shown in FIGS. 1 and 2. The gas turbine engine 22 is mounted to establish an engine axis of rotation 32 that is different from the propeller axis 30. An offset angle α greater than 0 degrees is formed between the propeller axis 30 and the engine axis of rotation 32. Because of the engine axis of rotation 32 and the offset angle α, exhaust gasses output from the gas turbine engine 22 form a vector having a downward directional component that provides lift to the airplane 10 relative to the ground when the turboprop propulsion system 14 is in use and the airplane 10 is on the ground.

In the illustrative embodiment, the offset angle α may be between 10 degrees and 15 degrees or may form another suitable non-zero angle. More particularly, in the illustrative embodiment, the offset angle α is about, or precisely, 13 degrees. Given the relative length of the gas turbine engine 22 and other components in the illustrative embodiment, a 10-15 degree angle optimizes the front facing area of the overall assembly while providing a clear direct line of sight from atmosphere to an inlet 38 of the gas turbine engine 22 as discussed herein. Angles of less than 10 degrees could require designing an inlet air flow path that curves and creates additional forward facing drag. Angles of greater than 15 degrees could result in a larger percentage of the engine cross section to the front facing area (e.g., for illustrative purposes give an example where a 90 degree orientation would require a front facing area equal to the entire length of the engine).

The gas turbine engine 22 illustratively includes a compressor 34, a combustor 36, a turbine 40, and an output shaft 60 as shown in FIG. 2. The compressor 34 receives air from an inlet 38 and compresses the air before delivering it to the combustor 36. The combustor 36 adds and ignites fuel in the compressed air provided by the compressor 34. Hot, high-pressure combustion products then pass from the combustor 36 into the turbine 40 where the combustion products are used to turn turbine wheels coupled to the compressor 34 and to the output shaft 60 causing them to rotate. Hot exhaust products are discharged out of the turbine 40 through an outlet 41.

The gearbox 24 is configured to accommodate the offset angle α established between the output shaft 60 of the gas turbine engine 22 and the propeller 20 as shown in FIG. 2. In the illustrative embodiment, the gear box 24 is configured to step down the speed of the output shaft 60 so that the propeller 20 is rotated more slowly than the output shaft 60 of the gas turbine engine 22.

The turboprop propulsion system 14 of the illustrative embodiment also includes a nacelle 26 that houses the gas turbine engine 22 and at least a portion of the gearbox 24 as shown in FIG. 2. The nacelle 26 is integrated into the airframe 12 and supports the propeller 20, the gas turbine engine 22, and the gearbox 24 relative to the rest of the airframe 12.

Figure 3:
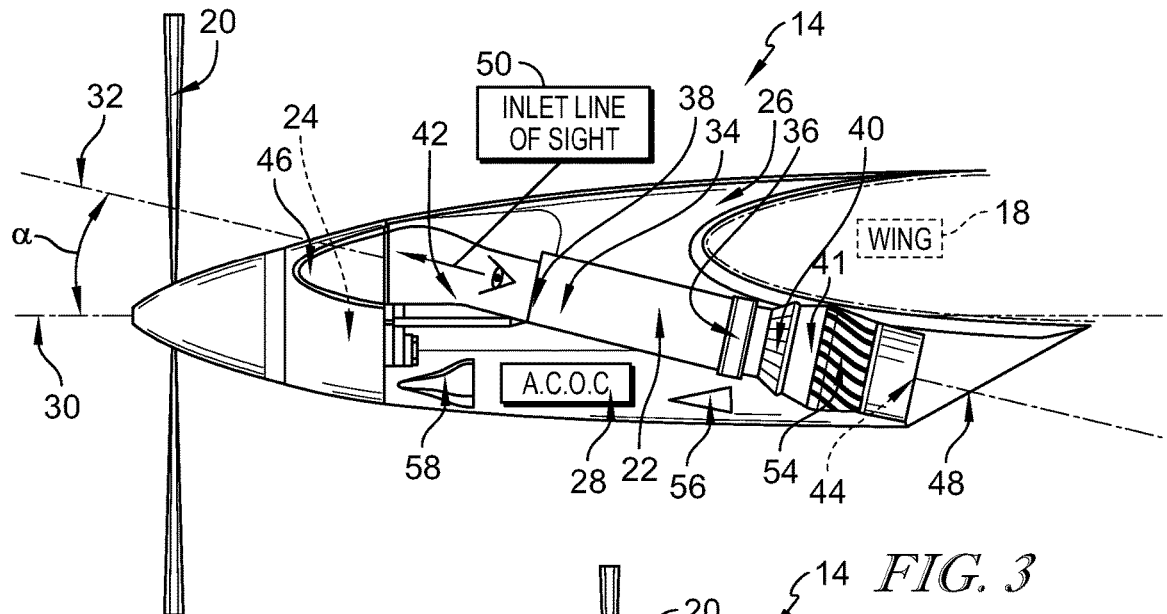
FIG. 3 is a view similar to FIG. 2 showing that inlet ducts included in the nacelle form a direct line of sight from an inlet of the gas turbine engine to an engine-air-entry aperture of the nacelle such that pressure losses through the inlet ducts is controlled.
Figure 4:
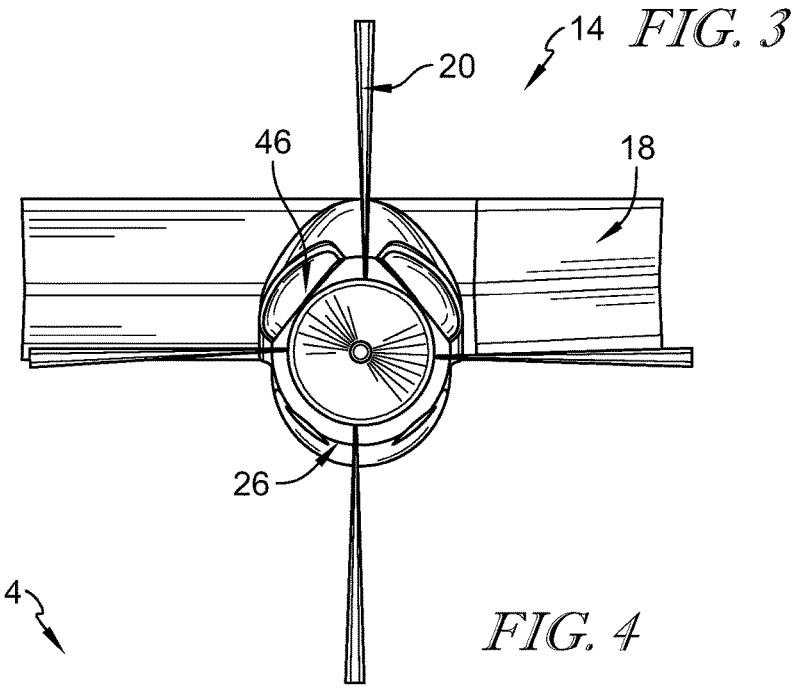
FIG. 4 is a front elevation view of the turboprop propulsion system of FIGS. 1-3 showing the turboprop propulsion system mounted to a wing included in the airframe of the airplane.
Figure 5:
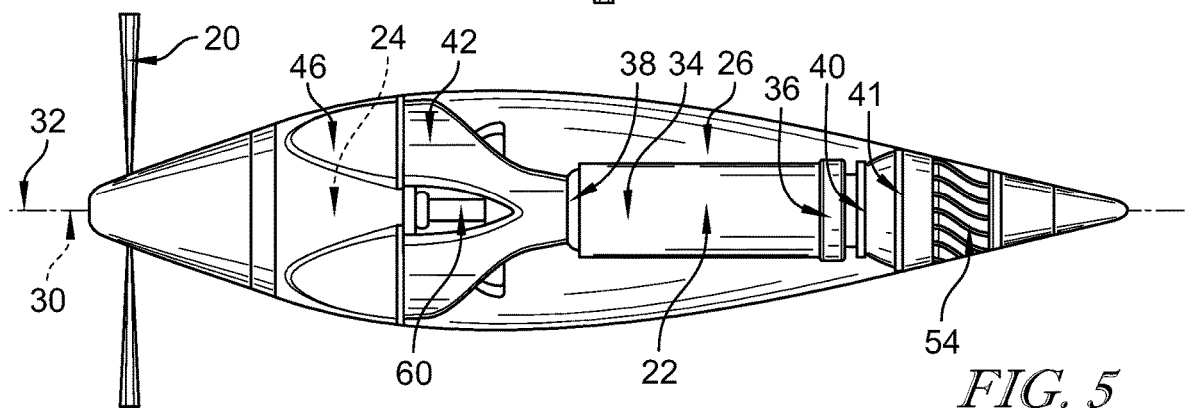
FIG. 5 is a top plan view of the turboprop propulsion system of FIGS. 1-4 with portions of the nacelle removed to show the inlet ducts of the nacelle.

The nacelle 26 includes an inlet duct 42 forming an engine-air-entry aperture 46 and an exhaust duct 44 forming an exhaust-outlet aperture 48 as shown in FIGS. 3-5. The inlet duct 42 conducts air to the inlet 38 of the gas turbine engine 22 and is shaped to provide a direct inlet line of sight 50 from the inlet 38 of the gas turbine engine 22 to the engine-air-entry aperture 46 as shown in FIG. 3. The exhaust duct 44 is positioned on the engine axis of rotation 32 and coupled between the outlet 41 of the gas turbine engine 22 and the exhaust-outlet aperture 48 to conduct the flow of exhaust gasses to the exhaust-outlet aperture 48. The exhaust duct 44 is shaped to provide a direct exhaust line of sight 52 from the outlet 41 of the gas turbine engine 22 to the exhaust-outlet aperture 48 as shown in FIG. 6.

In the illustrative embodiment, the inlet duct 42 has a Y-shape that extends to two engine-air-entry apertures 46 as shown in FIG. 5. Direct lines of sight are provided from the inlet 38 of the gas turbine engine 22 to both of the engine-air-entry apertures 46. Accordingly, pressure drop to the inlet 38 of the gas turbine engine 22 is minimized.

The turboprop propulsion system 14 disclosed includes an optional infrared suppressor 54 adapted to cool exhaust gasses discharged from the gas turbine engine 22 reducing engine heat signature as suggested in FIG. 2. The infrared suppressor 54 is coupled to the turbine 40 of the gas turbine engine 22 and positioned on the engine axis of rotation 32. The infrared suppressor 54 is configured to conduct exhaust gasses away from the outlet 41 of the gas turbine engine 22 toward the exhaust-outlet aperture 48 of the nacelle 22 to facilitate the movement of high temperature exhaust gasses away from the propulsion system 14. The infrared suppressor 54 is positioned to have a direct exhaust line of sight 52 from the exhaust outlet 40 of the gas turbine engine 22 to the exhaust-outlet aperture 48 of the nacelle 26. Accordingly, redirecting the flow of high temperature exhaust gasses via curved walls of the nacelle or other structures susceptible to increased heat signature characteristics is not necessary when the turboprop propulsion system 14 is used in the airplane 10.

Figure 6:
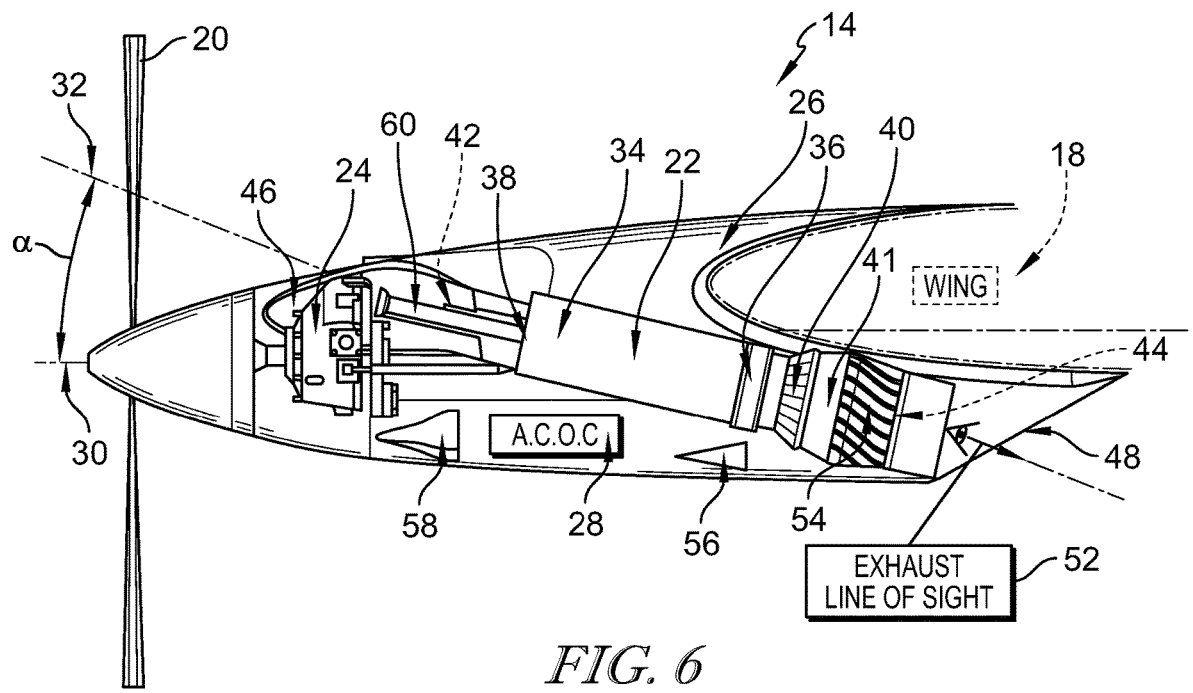
FIG. 6 is a view similar to FIGS. 2 and 3 showing that an exhaust duct included in the nacelle form a direct line of sight from an exhaust discharge outlet of the gas turbine engine to an exhaust-outlet aperture of the nacelle such that pressure losses through the exhaust duct is controlled and showing that an infrared suppressor coupled to the gas turbine engine also has a direct line of sight from the exhaust discharge outlet of the gas turbine engine so that hot spots associated with bends in the infrared suppressor are avoided.
Figure 7:
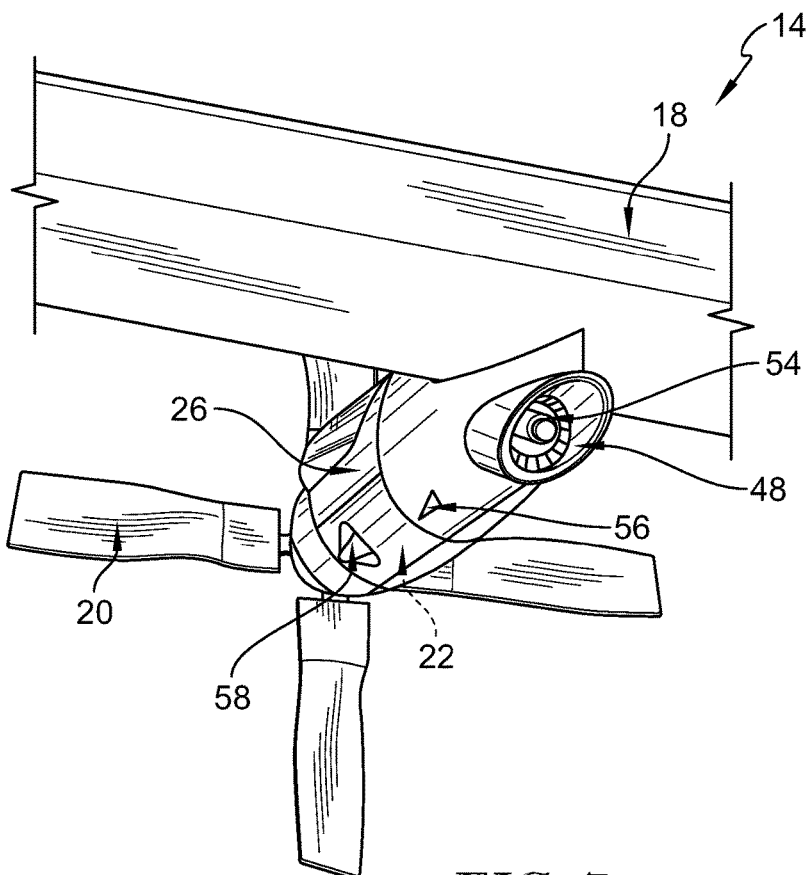
FIG. 7 is an aft perspective view of the turboprop propulsion system of FIGS. 1-6 showing the turboprop propulsion system mounted to the wing of the airframe included in the airplane.

The nacelle 26 is formed to include a suppressor-air aperture 56 through which cooling air is passed to the infrared suppressor 54 as shown in FIGS. 6 and 7. The suppressor-air aperture 56 is arranged forward of the infrared suppressor 54 relative to a forward direction F of the airplane 10, as shown in FIG. 1. The suppressor-air aperture 56 is spaced apart from the engine-air-entry aperture 46 of the nacelle 22.

The turboprop propulsion system 14 of the present disclosure includes a heat exchanger 28 housed in the nacelle 26 and positioned below the gas turbine engine 22 when the airplane 10 is landed on the ground as shown in FIGS. 1 and 2. The heat exchanger 28 is illustratively an air-cooled oil cooler for use in cooling oil used in the gas turbine engine 22. The nacelle 26 is formed to include a cooling-air aperture 58 arranged forward of the heat exchanger 28 relative to a forward direction F of the airplane 10, as shown in FIG. 1. The cooling-air aperture 58 is configured to conduct air to the heat exchanger 28 during use of the turboprop propulsion system 14. The cooling-air aperture 58 is spaced apart from the engine-air-entry aperture 46 of the nacelle 22.

The propulsion system 14 of the present disclosure includes an engine 22 angled nose up to permit a reduced frontal area, an improved fineness ratio, a reduction in wetted area of the nacelle 26, a corresponding weight reduction, and improved engine installation characteristics. In some implementations the angled engine design of the present disclosure allows for reduced backpressure, improved inlet performance, and better use of volume within the nacelle 26. The angled engine design of the present disclosure may also permit a more shallow aft body reducing boat-tail drag and reducing or eliminating wing and flap exhaust heating, which allows for improved infrared signature characteristics. The available space leaves enough volume for other critical subsystems including the air cooled oil cooler accessories (i.e. heat exchanger 28), the infrared suppressor 54, and a power unit accessory drive. The characteristics mentioned above allow for a lesser weight, lesser drag, and lesser cost for a vehicle that desires an optimized turboprop installation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turboprop propulsion system adapted for use in an airplane having an airframe, the turboprop propulsion system adapted for fixed connection to the airframe, the system comprising:
   a propeller mounted for rotation about a propeller axis,
   a gas turbine engine mounted to establish an engine axis of rotation different from the propeller axis to form an offset angle therebetween, and
   a gearbox coupled between the propeller and the gas turbine engine and configured to accommodate the offset angle between the propeller axis and the engine axis of rotation,
   wherein the propeller axis and the engine axis of rotation are fixed with respect to each and are located within a single nacelle.

2. The turboprop propulsion system of claim 1, wherein the offset angle is between 10 degrees and 15 degrees.

3. The airplane of claim 1, wherein the nacelle includes an inlet duct shaped to provide a direct line of sight from an inlet of the gas turbine engine to an engine-air-entry aperture of the nacelle.

4. The turboprop propulsion system of claim 1, wherein the nacelle houses the gas turbine engine, the nacelle including an exhaust duct shaped to provide a direct line of sight from an exhaust discharge outlet of the gas turbine engine to an exhaust-outlet aperture of the nacelle.

5. The turboprop propulsion system of claim 4, further comprising an infrared suppressor coupled to the gas turbine engine and configured to conduct exhaust gasses at least part way from the exhaust discharge outlet of the gas turbine engine to the exhaust-outlet aperture of the nacelle, wherein the infrared suppressor has a direct line of sight from the exhaust discharge outlet of the gas turbine engine to the exhaust-outlet aperture of the nacelle.

6. The turboprop propulsion system of claim 4, wherein the inlet duct has a Y-shape having first and second portions that extend to respective ones of two engine-air-entry apertures and a third portion that extends to the inlet of the gas turbine engine and direct lines of sight are provided from the inlet of the gas turbine engine to both of the engine-air-entry apertures.

7. An airplane comprising
   an airframe including a fuselage and a wing coupled to the fuselage, and
   a turboprop propulsion system coupled to the wing to provide thrust for the airplane, the turboprop propulsion system including a propeller mounted for rotation about a propeller axis and a gas turbine engine coupled to the propeller to drive the propeller about the propeller axis,
   wherein the gas turbine engine is mounted to establish an engine axis of rotation different from the propeller axis and form an offset angle between the propeller axis and the engine axis of rotation, wherein the propeller axis and the engine axis of rotation are fixed with respect to each other and are located within a single nacelle, and wherein the engine axis of rotation and the propeller axis are fixed with respect to the airframe.

8. The airplane of claim 7, wherein the nacelle houses the gas turbine engine, and wherein the nacelle includes an inlet duct shaped to provide a direct line of sight from an inlet of the gas turbine engine to an engine-air-entry aperture of the nacelle.

9. The airplane of claim 7, wherein the nacelle houses the gas turbine engine and an infrared suppressor coupled to the gas turbine engine, the infrared suppressor is configured to conduct exhaust gasses at least part way from an exhaust discharge outlet of the gas turbine engine to an exhaust-outlet aperture of the nacelle, and the infrared suppressor has a direct line of sight from the exhaust discharge outlet of the gas turbine engine to an exhaust-outlet aperture of the nacelle.

10. The airplane of claim 9, wherein the nacelle is formed to include a suppressor-air aperture configured to conduct air to the infrared suppressor during use of the turboprop propulsion system and an engine-air-entry aperture configured to conduct air to the gas turbine engine during use of the turboprop propulsion system, and wherein the suppressor-air aperture is spaced apart from an engine-air-entry aperture.

11. The airplane of claim 7, wherein the gas turbine engine is mounted such that a vector of exhaust gasses discharged from the gas turbine engine during use has a downward component that provides lift to the airplane relative to the ground when the airplane is landed on the ground when the turboprop propulsion system is in use.

12. The airplane of claim 11, wherein the offset angle is between 10 degrees and 15 degrees.

13. The airplane of claim 7, wherein the turboprop propulsion system includes a gearbox coupled between the propeller and the gas turbine engine and configured to accommodate the offset angle between the propeller axis and the engine axis of rotation by coupling to the propeller mounted for rotation about the propeller axis and to an output shaft of the gas turbine engine adapted to rotate about the engine axis of rotation.

14. The airplane of claim 13, wherein the nacelle houses the gas turbine engine and at least part of the gearbox.

15. The airplane of claim 7, wherein the nacelle houses the gas turbine engine, the nacelle including an exhaust duct shaped to provide a direct line of sight from an exhaust discharge outlet of the gas turbine engine to an exhaust-outlet aperture of the nacelle.

16. The airplane of claim 15, wherein the turboprop propulsion system includes an infrared suppressor coupled to the gas turbine engine and configured to conduct exhaust gasses at least part way from the exhaust discharge outlet of the gas turbine engine to the exhaust-outlet aperture of the nacelle, wherein the infrared suppressor has a direct line of sight from the exhaust discharge outlet of the gas turbine engine to the exhaust-outlet aperture of the nacelle.

17. The airplane of claim 15, wherein the nacelle includes an inlet duct shaped to provide a direct line of sight from an inlet of the gas turbine engine to an engine-air-entry aperture of the nacelle.

18. The airplane of claim 17, wherein the turboprop propulsion system includes a heat exchanger housed in the nacelle and the nacelle is formed to include a cooling-air aperture through which air flows to the heat exchanger during use of the turboprop propulsion system and the cooling-air aperture is spaced apart from the engine-air-entry aperture of the nacelle.

19. The airplane of claim 18, wherein the heat exchanger is arranged below the gas turbine engine when the airplane is landed on the ground.

\* \* \* \* \*